United States Patent
Morelos-Zaragoza et al.

(10) Patent No.: US 6,643,332 B1
(45) Date of Patent: Nov. 4, 2003

(54) METHOD AND APPARATUS FOR MULTI-LEVEL CODING OF DIGITAL SIGNALS

(75) Inventors: Robert Morelos-Zaragoza, Sunnyvale, CA (US); Shu Lin, Honolulu, HI (US); Marc Fossorier, Honolulu, HI (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/350,700

(22) Filed: Jul. 9, 1999

(51) Int. Cl.$^7$ ............................................. H04L 23/02
(52) U.S. Cl. ...................................................... 375/265
(58) Field of Search ........................... 375/240.24, 240.1, 375/240.11, 265, 295, 316; 714/774, 759, 798, 790, 786

(56) References Cited

U.S. PATENT DOCUMENTS

| | | | | |
|---|---|---|---|---|
| 5,471,497 A | * | 11/1995 | Zehavi | 375/142 |
| 5,621,761 A | * | 4/1997 | Heegard | 341/106 |
| 5,838,267 A | * | 11/1998 | Wang et al. | 341/94 |
| 5,907,363 A | * | 5/1999 | Botsford et al. | 375/240.05 |
| 6,031,874 A | * | 2/2000 | Chennakeshu et al. | 375/262 |
| 6,061,405 A | * | 5/2000 | Emami | 375/260 |
| 6,088,387 A | * | 7/2000 | Gelblum et al. | 375/222 |
| 6,160,854 A | * | 12/2000 | Heegard et al. | 375/265 |
| 6,185,339 B1 | * | 2/2001 | Ozaki | 382/232 |
| 6,253,347 B1 | * | 6/2001 | Koslov | 714/789 |
| 6,289,486 B1 | * | 9/2001 | Lee et al. | 714/701 |
| 6,298,463 B1 | * | 10/2001 | Bingeman et al. | 714/755 |
| 6,307,892 B1 | * | 10/2001 | Jones et al. | 375/260 |
| 6,320,850 B1 | * | 11/2001 | Perahia et al. | 370/248 |
| 6,334,197 B1 | * | 12/2001 | Eroz et al. | 714/701 |
| 6,339,834 B1 | * | 1/2002 | Crozier et al. | 714/701 |
| 6,370,669 B1 | * | 4/2002 | Eroz et al. | 714/774 |
| 6,466,624 B1 | * | 10/2002 | Fogg | 375/240.27 |
| 6,496,233 B1 | * | 12/2002 | Christine et al. | 375/240.02 |
| 6,529,635 B1 | * | 3/2003 | Corwin et al. | 382/243 |

* cited by examiner

*Primary Examiner*—Emmanuel Bayard
(74) *Attorney, Agent, or Firm*—Christopher P. Maiorana, P.C.

(57) ABSTRACT

A method and apparatus for multi-level encrypted encoding and decoding of digital signals, which includes utilizing only one type of encoder and one type of decoder. This can be either the same encoder and decoder used in throughout the process, or multiple, identical encoders and decoders. This allows the system to compensate for atmospheric degradation with higher bandwidth efficiency and a simplified receiver structure. The invention further identifies a $2^j$ symbol generation technique that maps in disjoint regions of X-dimensional space, which allows different data bits to be eliminated from the decoding scheme and maximizes the number of independent data substreams that can be maintained.

35 Claims, 6 Drawing Sheets

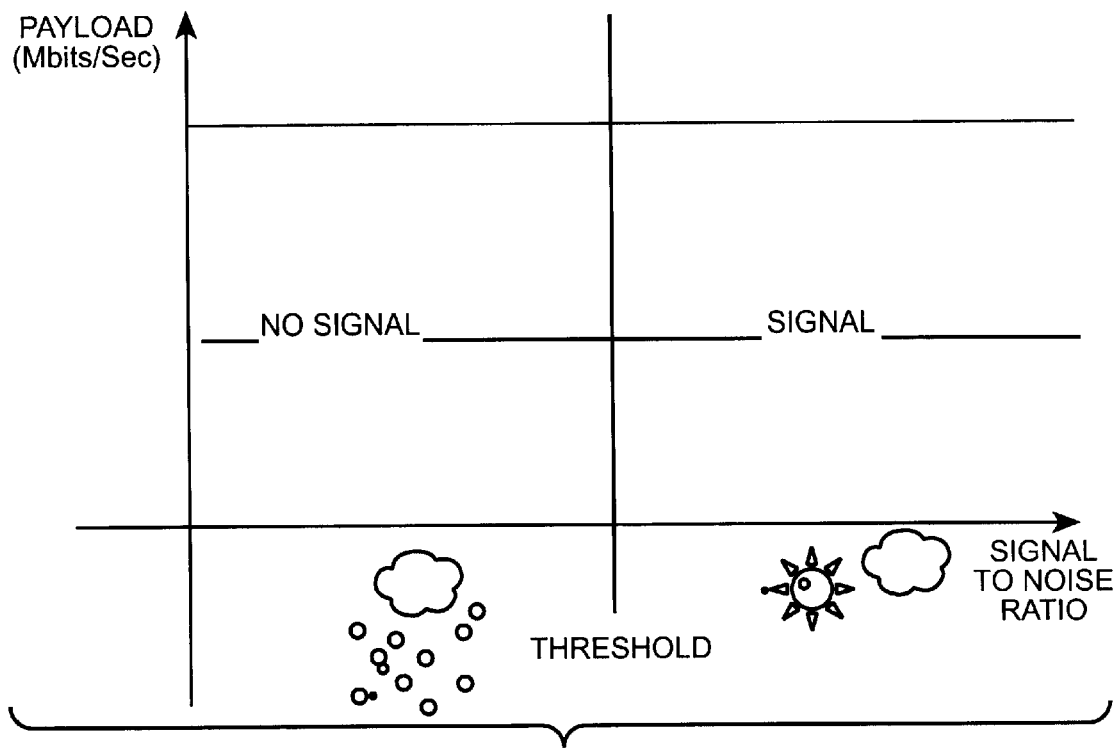
FIG._1A
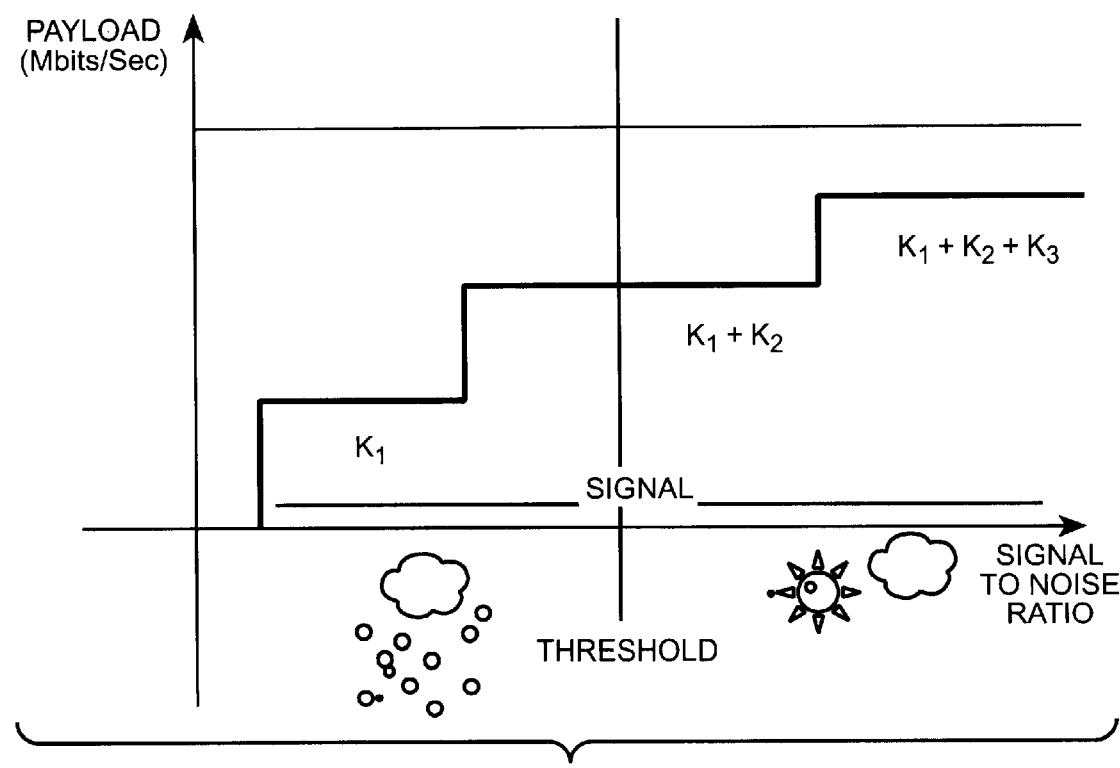
FIG._1B

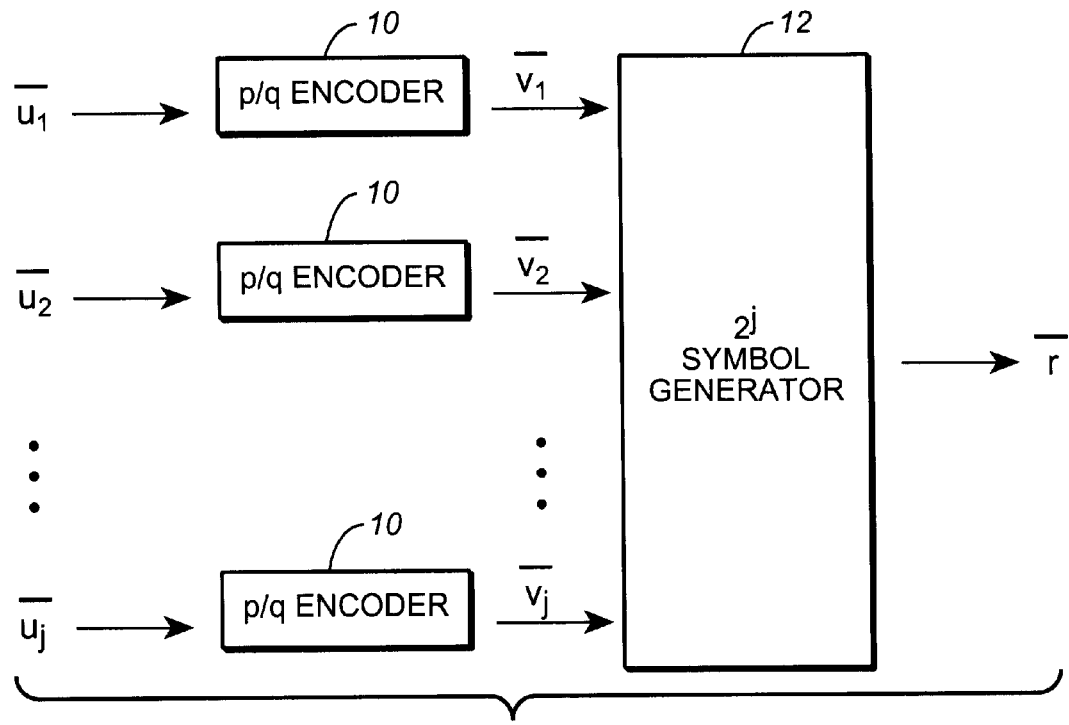
FIG._2A
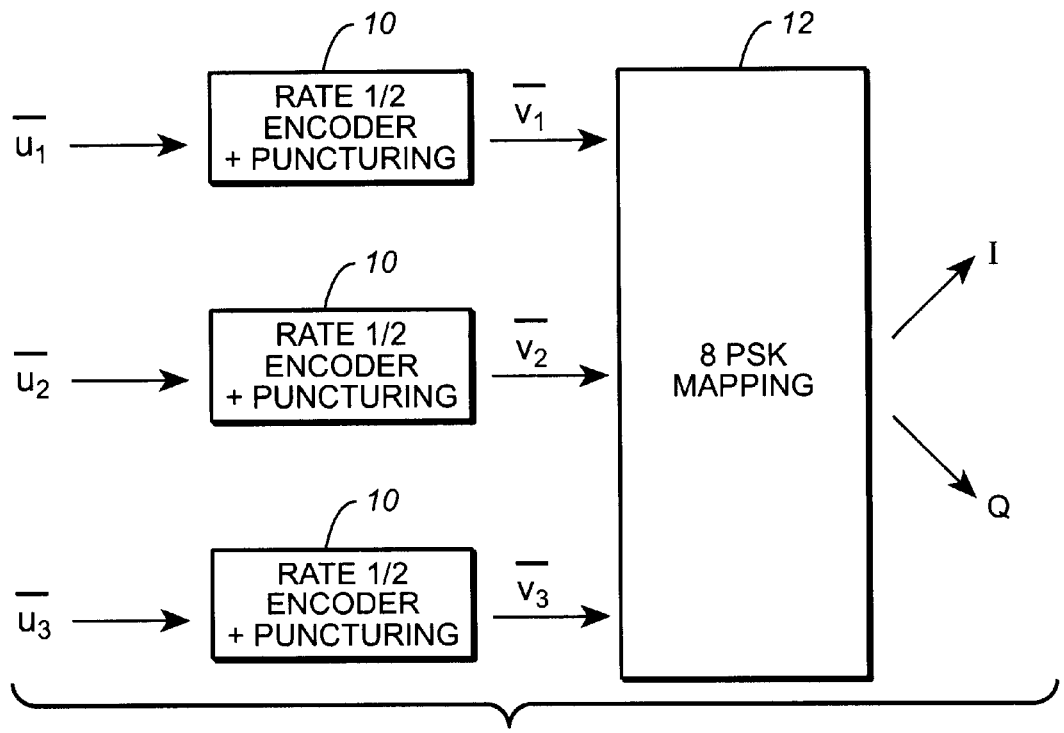
FIG._2B

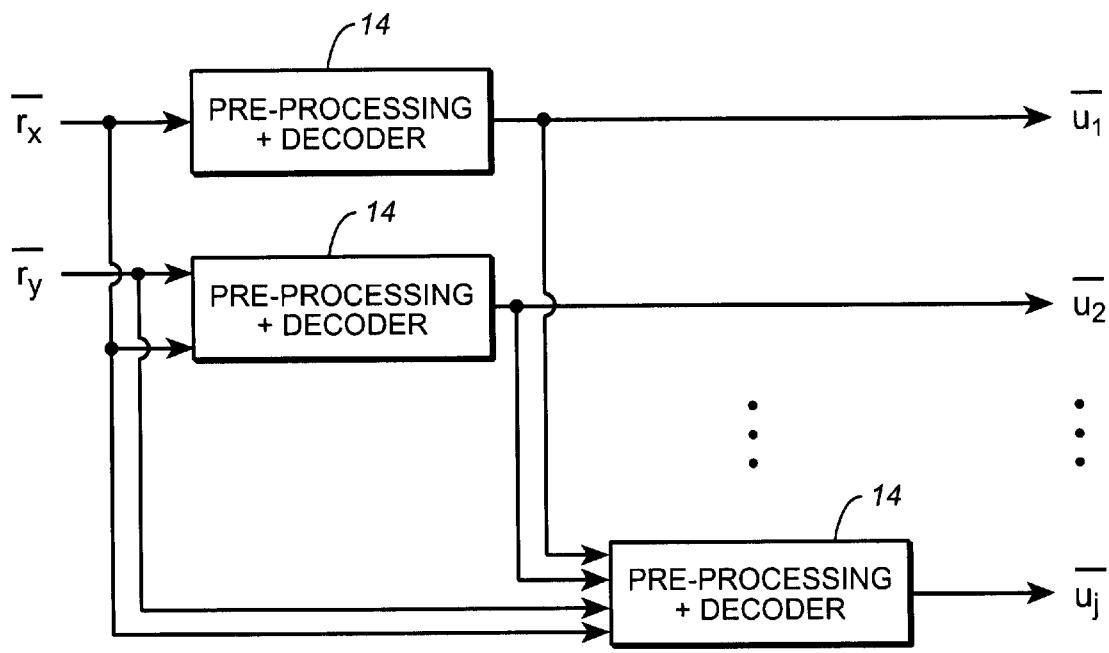
FIG._3A
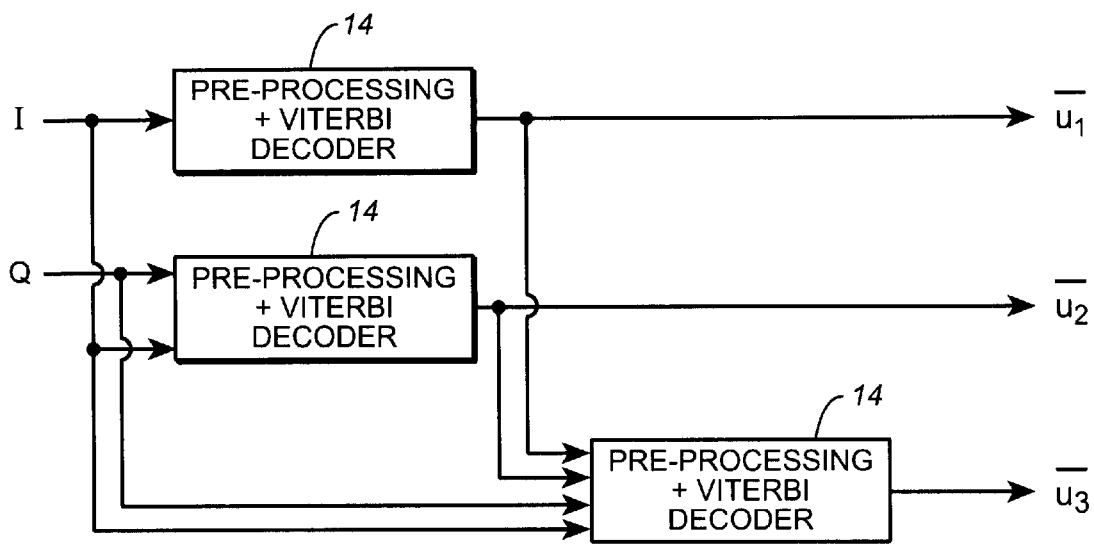
FIG._3B

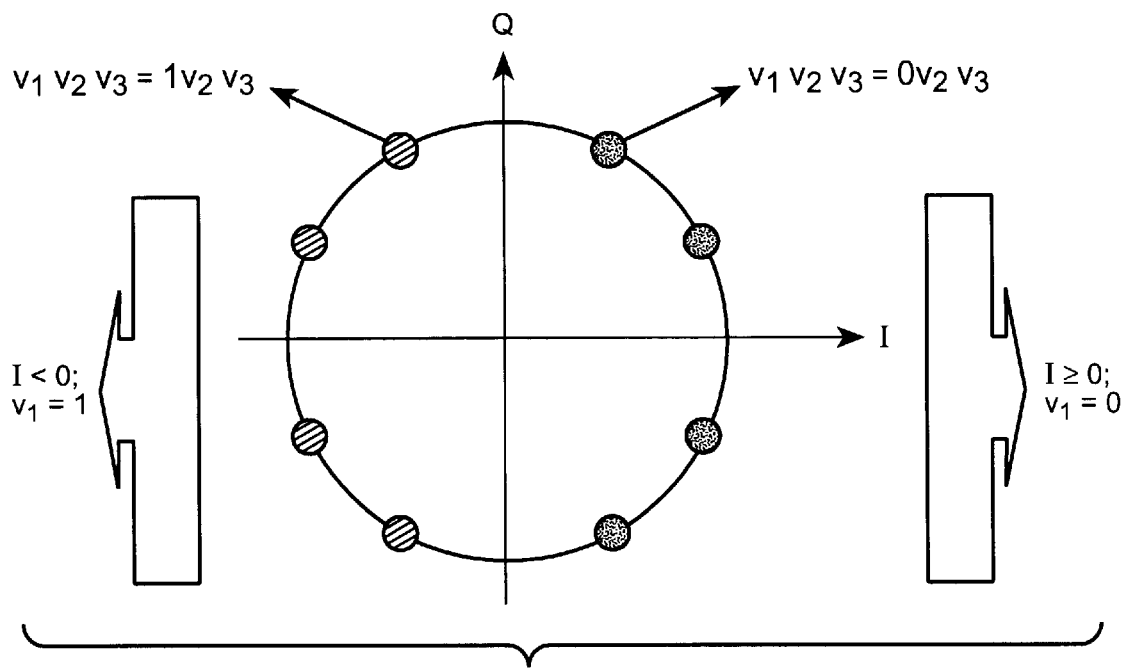
*FIG._4A*
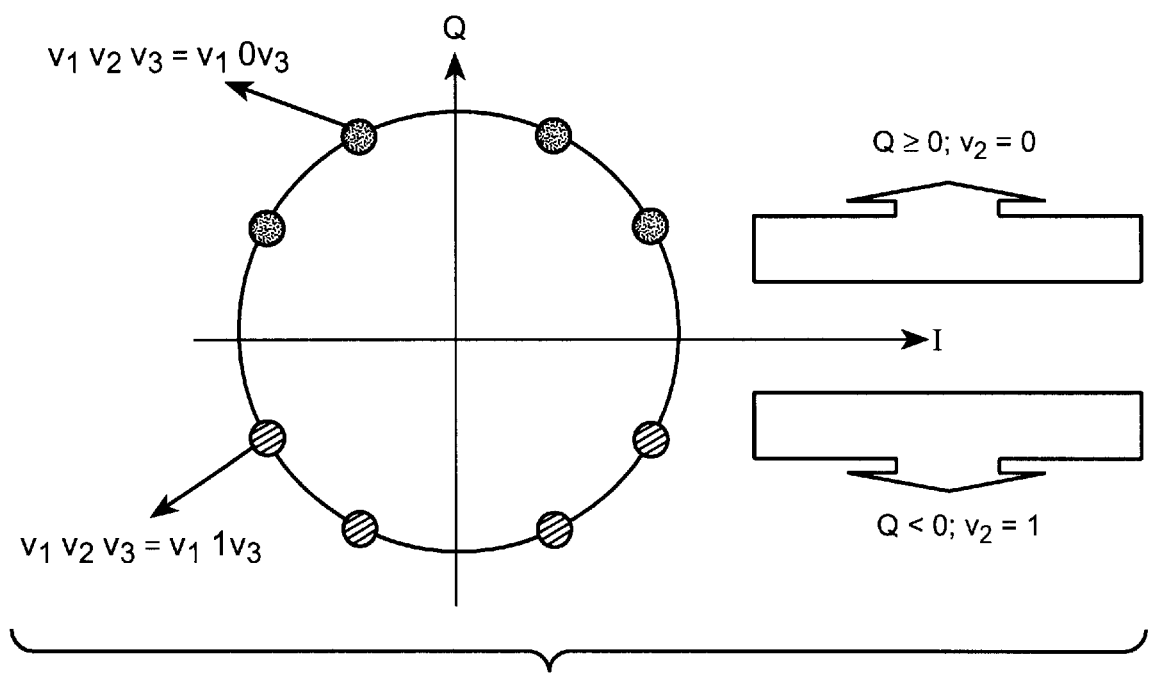
*FIG._4B*

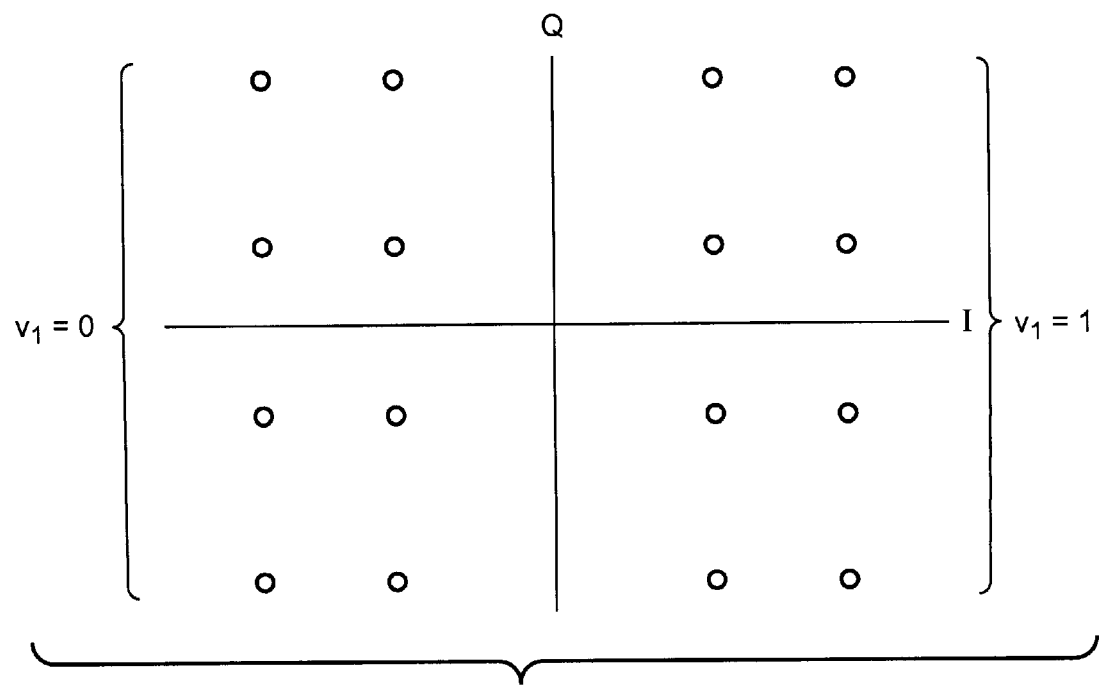
FIG._5A
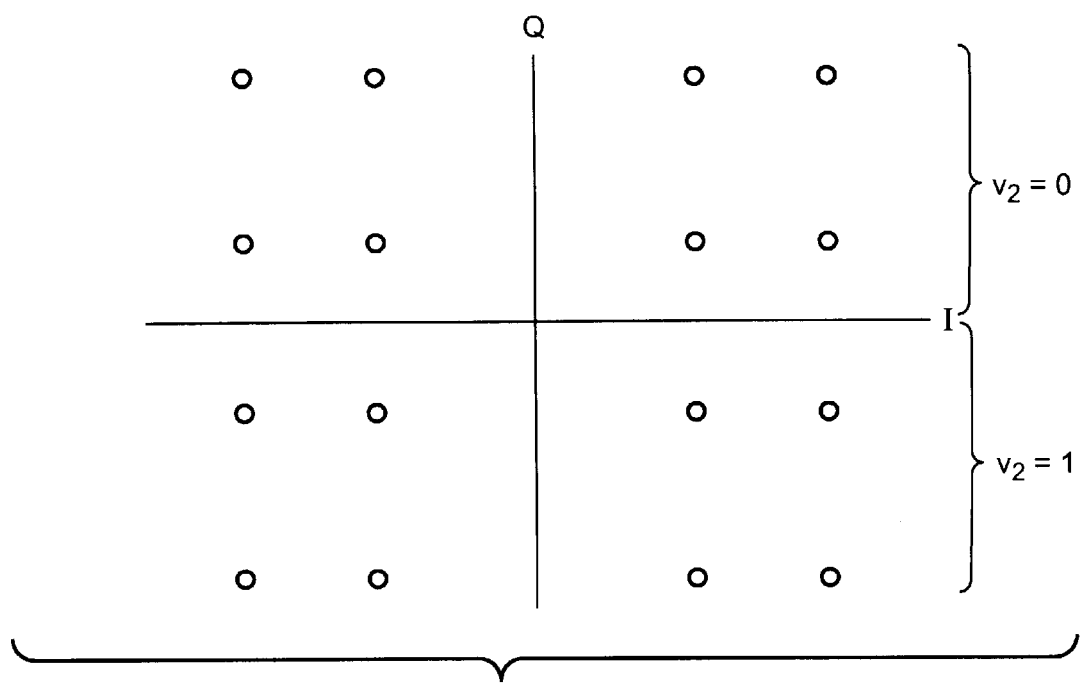
FIG._5B

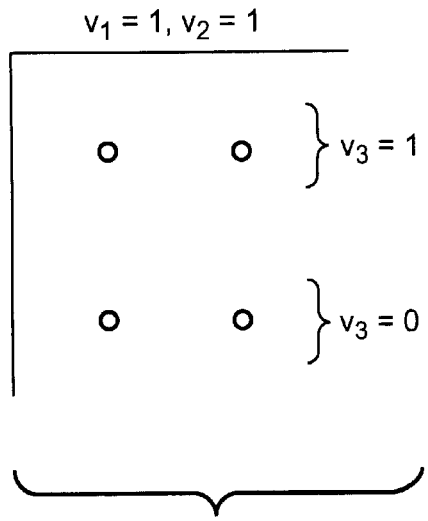
FIG._5C
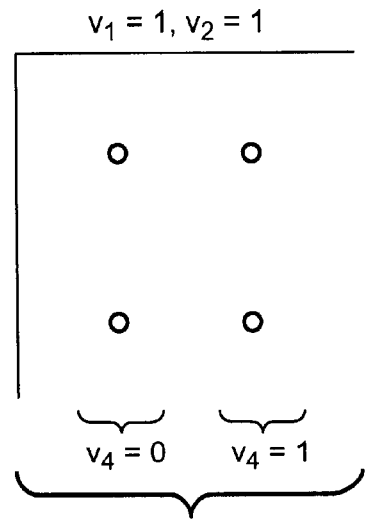
FIG._5D
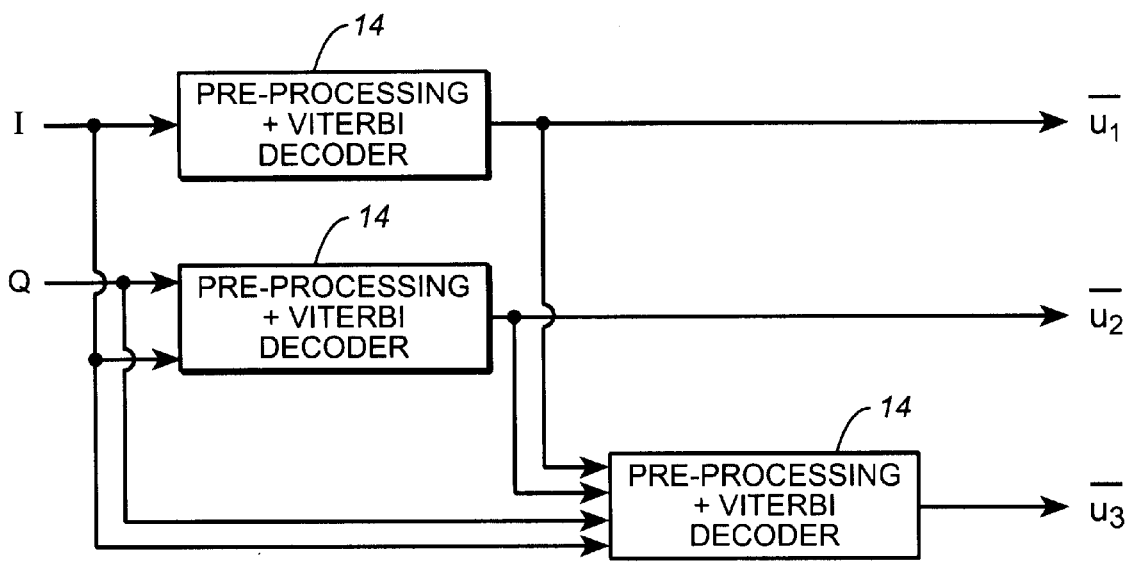
FIG._6

METHOD AND APPARATUS FOR MULTI-LEVEL CODING OF DIGITAL SIGNALS

BACKGROUND OF THE INVENTION

1. Field of the Invention

The present invention relates to encoding and decoding of digital communication systems. More particularly, the present invention relates to multi-level encoding and decoding digital bits using the same or an identical encoder and decoder.

2. The Prior Art

Generally, communication systems include both a digital signal transmission and receiving system. The transmission portion of the digital signal transmission and receiving system includes an encoder, possibly a puncturing or zero-tailing module, and a modulator, providing a modulated signal at a communication channel. Similarly, a receiving portion of the digital signal transmission and receiving system includes a demodulator, possibly a depuncturing or block decoder module if punctured or zero-tailed, respectively, during encoding, and a decoder.

The modulated signal includes an in-phase component and a quadrature component. When the modulated signal is received, after conversion from an analog to a digital signal, each bit is demodulated into the in-phase and quadrature signal components by the demodulator using sine and cosine functions. The decoder may comprise a Viterbi decoder, which may be used to decode these convolutional codes.

In satellite broadcasting, severe location-dependent fades can occur due to rain attenuation. If a single trellis coded modulation (TCM) scheme is used, then those locations with severe attenuation will loose the incoming signal, as shown in FIG. 1a. On the other hand, by using different TCM schemes, the digital signal can be encoded in such a way that information at a lower rate is received under severe attenuation. Receivers in locations with less adverse atmospheric conditions can receive information at higher rates, as shown in FIG. 1b. This is known as graceful degradation. However, to achieve an efficient system design, different constellations may need to be used in multiplexing TCM schemes. Thus, a control mechanism to switch seemlessly between different rates and constellations is required. This leads to a reduced throughput, due to overhead information, as well as a more complex receiver structure to process different signal constellations and to synchronize properly.

What is needed is a method which would work over the same constellation without degrading the signal under adverse atmospheric conditions; thereby, eliminating the overhead associated with multiplexing control and/or rate switching.

BRIEF DESCRIPTION OF THE INVENTION

The purpose of the present invention is to provide a method and apparatus for encoding and decoding digital signals which would allow the system to compensate for atmospheric degradation using a multilevel, j, encoding/decoding system where each level uses either the same or an identical encoder/decoder. This would allow for higher bandwidth efficiency and would simplify the structure of the receiver.

The encoding method includes the steps of: choosing a component code rate, $r_j$, for each substream, splitting the data stream into a plurality, j, of data substreams, sending each substream through an identical encoder; possibly puncturing or zero-tailing each data substream, combining the substreams into symbols of n output length, applying a $2^j$ symbol generator that provides an output of a plurality of modulator values, applying these modulator values to a modulator for transmission over the channel. The multi-stage decoding method includes the steps of: receiving the multi-level encoded, modulated signal, pre-processing the data including depuncturing or block decoding if the data was punctured or zero-tailed respectively during encoding, sending the data through an identical decoder, saving the first-level information bits in a buffer, and repeating the process of pre-processing, decoding, storing, and delivering the data for j-stages. Additionally, using a nonstandard partitioning scheme, encoded data can be mapped into disjoint regions of X-dimensional space, creating independent variables that can be identified and eliminated from decoding schemes.

BRIEF DESCRIPTION OF THE FIGURES

FIG. 1a is a diagram which depicts the standard digital signal using 1 level of information for the encoder and decoder under different atmospheric conditions;

FIG. 1b is a diagram which depicts the digital signal using multi-levels (e.g. 3 levels) of information for the encoder and decoder under different atmospheric conditions;

FIG. 2a is a block diagram which depicts a multi-level encoding system using the same or an identical encoder;

FIG. 2b is a block diagram depicts a three-level encoding system using the same or an identical rate ½ encoder and 8PSK mapping;

FIG. 3a is a block diagram depicts a multi-stage decoder of multi-level coded, modulated signal using the same or an identical decoder;

FIG. 3b is a block diagram depicts a three-stage decoder of three-level convolutionally coded 8-PSK modulated signal using the same or an identical Viterbi decoder;

FIG. 4a is a block diagram depicts 8PSK mapping for the I-channel, where $v_1$ bits can be eliminated from decoding;

FIG. 4b is a block diagram depicts 8PSK mapping for the Q-channel, where $v_2$ bits can be eliminated from decoding;

FIG. 5a is a quadrature map which depicts 16QAM mapping for the I-channel, where $v_1$ bits can be eliminated from decoding;

FIG. 5b is a quadrature map which depicts 16QAM mapping for the Q-channel, where $v_1$ bits can be eliminated from decoding;

FIG. 5c is a portion of a quadrature map which depicts 16QAM mapping for the quadrant, $v_1=1$, $v_2=1$, where $V_3$ bits can be eliminated from decoding;

FIG. 5d is a portion of a quadrature map depicts 16QAM mapping for the quadrant, $v_1=1$, $v_2=1$, where $v_4$ bits can be eliminated from decoding;

FIG. 6 is a block diagram which depicts a three-stage decoder of three-level convolutionally coded 8-PSK non-standard mapping, modulated signal using the same or an identical Viterbi decoder as the example of FIG. 3b.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons after a review of this disclosure.

The encoding method is a multi-level process to enhance digital signal in rain attenuation situations and similar atmospheric conditions, as depicted by FIG 1b. Unlike traditional multi-level encoding processes, the present invention makes use of either the exact same or an identical decoder at each level. If the same encoder is utilized, space on the encoding chip is minimized since only one encoder is required and this further reduces the cost of manufacture.

The designer must choose the desired number of substreams, j, into which to break the data stream and select the corresponding $2^j$ symbol generator. The number of data substreams can be any integer greater than one, where the level of the $2^j$ symbol generator is determined by the number of substreams chosen. For example, if the number of substreams chosen is three, then the symbol generator is eight ($2^j$ for j=3); if the number of substreams chosen is four, then the symbol generator is sixteen ($2^j$ for j=4); and if the number of substreams chosen is five, then the symbol generator is thirty-two ($2^j$ for j=5). One illustrative embodiment would be to divide the digital stream into three substreams of information and apply 8PSK mapping. Another illustrative embodiment would be to create six data substreams and apply 64QAM mapping. Any number of feasible combinations are intended to be within the broad concept of the present invention.

Additionally, the designer must chose a component code rate, $r_j$, for each data substream, which will then determine a number of other key variables. The component code rate, $r_j$, is defined by the following equation:

$$r_j = k_j/n_j \qquad \text{eqn. 1}$$

As an example, if the component code rates are selected to be $1/3$, $2/3$, and $11/12$ respectively for three substreams, then $k_1=1$, $k_2=2$, $k_3=11$ and $n_1=3$, $n_2=3$, and $n_3=12$. The output length, n, is defined as the least common multiple of $n_1, \ldots, n_j$. Using the same example component code rates, n would be the least common multiple of 3, 3, and 12, which would be 12. The number of information bits contained in each substream is calculated as follows:

$$m_j = n(k_j/n_j) \qquad \text{eqn. 2}$$

Using the same example component code rates from above, $m_1=4$, $m_2=8$, and $m_3=11$.

As will now be apparent to those skilled in the art, this method can also be applied to block codes instead of convolutional codes for very high-speed communications.

Finally, the designer must also select the type of encoder to use, where the encoder is a p/q encoder 10 and p is less than q. This means that more symbols will be output than the original number of $m_j$ bits passed to the encoder. For example, if the encoder is a ½ rate encoder, it outputs two bits for every one input bit. Likewise, if the encoder is a ¾ rate encoder, it outputs four bits for every three input bits.

Following FIG. 2a, the encoding steps can be shown for the general embodiment of the present invention. Once the data, $u_1 \ldots u_j$, is split into j substreams, it is then passed to either the same or an identical p/q encoder 10, where p is less than q. To use the same encoder, a multiplexer is required to transmit sequentially the substreams through the p/q encoder 10. Subsequent to encoding and prior to mapping, an additional step of either puncturing or zero-tailing may be used to remove or add additional data bits. After the encoding and possibly puncturing or zero-tailing, the encoded substreams are combined into a single stream of n symbols. This stream is passed to a $2^j$ symbol generator 12, which provides an output, $\bar{r}$, including a plurality of modulator values. These values are subsequently modulated and transmitted over the channel. Typical $2^j$ symbol generators 12 include Phase Shifted Keying (PSK) and Quadrature Amplitude Modulation (QAM).

The modulated output vector, $\bar{r}$, is often two-dimensional, $\bar{r}_x$ & $\bar{r}_y$, where $\bar{r}_x$=I-channel and $\bar{r}_y$=Q-channel. However, this invention includes the broad concept of mapping to any number of dimensions such as mapping to a three-dimensional sphere (x,y,z) or even into four dimensions (x,y,z,t) or more.

FIG. 2b shows an example embodiment with three data substreams, a rate ½ encoder 10, puncturing, and 8PSK 12 symbol generator with output to I and Q channels. Note that a single rate ½ encoder 10 could have been used with a multiplexer to alternately feed the substream data into the rate ½ encoder 10.

The multi-stage decoding method of the present invention also uses the same or an identical decoder to decode each level of information. As with the encoder, if the exact same decoder 14 is utilized, it will save space on the chip.

Following FIG. 3a, the incoming channel signal, $\bar{r}$, will be pre-processed and decoded at j-levels in order to decode the original encoded data substreams, $u_1, \ldots, u_j$. At each decoding stage, the data will be pre-processed to mirror the same techniques used during the encoding stage. For example, if the data was punctured at the encoding stage, the data will be depunctured in the decoding stage, or if the data was zero-tailed during the encoding stage, then the data will be block decoded in the decoding stage.

Whatever p/q encoder 10 was chosen in the encoding stage, the same rate decoder 14 will also be used in the decoding stage. Thus, for rate ½ encoded data, a rate ½ decoder will be utilized. As with the multi-level encoding process, the exact same p/q decoder 14 can be used at each level and the data can be modulated through the decoder. Otherwise, j identical p/q decoders 14 can be used on the decoding module.

Beginning at level 1, the signal, $\bar{r}$, is pre-processed and decoded. The corresponding data substream, $u_1$, is then saved into a buffer. At the next stage of decoding, j=2, the decoder will make use of both the original incoming signal $\bar{r}$, as well as the decoded information, $u_1$, from the previous stage. Following the same process at each level, the data is pre-processed, decoded, saved into a buffer, and then passed to the next decoding stage until all $u_j$ substreams are decoded.

FIG. 3b shows an example embodiment with input from two channels (I,Q), where there are three decoding stages that correlate with the original three encoded data substreams, and a rate ½ decoder 14. Note that a single rate ½ decoder 14 could have been used with a multiplexer to alternately feed the data into the rate ½ decoder 14.

In addition to minimizing the number of encoders and decoders utilitized, this invention also includes the use of a nonstandard partitioning scheme to maximize the number of independent data substreams that can be decoded. By mapping the data onto disjoint planes of two-dimensional space, the maximum number of substreams can be kept independent; thereby, minimizing the amount of data to be decoded.

Using a three-level 8PSK mapping as an example, the data can be mapped such that the tertiary bits, $v_1 v_2 v_3$ are essentially reduced to binary bits, making the decoding process simpler. Referring to FIG. 4a, the coded bits can be arranged such that only the X-coordinate is necessary to determine the first bit, $v_1$. The disjoint mapping allows for the first data bit, $v_1$, to be set to zero for X<0 and to be set to one for X≧0. Thus, the first data bit, $v_1$, can be eliminated from decoding. Likewise, referring to FIG. 4b, the Y-coordinate is sufficient to determine the value of the second bit, $v_2$. The disjoint mapping allows for the second data bit, $v_2$, to be set to zero for Y<0 and to be set to one for Y≧0. Thus, the second data bit, $v_2$, can be eliminated from decoding.

This same method can be applied to QAM mapping, where the bits can be reduced to binary. Using a 4 level, 16QAM as an example, FIGS. 5a–b show how six data can be reduced to essentially four bits. The disjoint mapping allows for the first data bit, $v_1$, to be set to one for positive values of I and to be set to zero for negative values of I, wherein the first data bit, $v_1$, can be eliminated from decoding. Further, the disjoint mapping allows for the second data bit, $v_2$, to be set to zero for positive values of Q and to be set to one for negative values of Q, wherein the second data bit, $v_2$, can be eliminated from decoding. FIGS. 5c–d show how it can be further reduced to binary data. Within each simplified quadrant, the disjoint mapping allows for the third data bit, $V_3$, to be set to zero for negative offset values of I and to be set to one for positive offset values of I, where the offset is a function of $v_1$ and $v_2$, wherein the third data bit, $V_3$, can be eliminated from decoding. Further, the disjoint mapping within each quadrant allows for the fourth data bit, $V_4$, to be set to zero for negative offset values of Q and to be set to one for positive offset values of Q, where the offset is a function of $v_1$ and $v_2$, wherein the fourth data bit, $v_4$, can be eliminated from decoding. Thus, the bits become essentially binary for decoding.

By utilizing this non-standard mapping technique to maximize the number of independent data substreams, the amount of information necessary in the decoding process is minimized. For example, referring to FIG. 6, using the 8PSK modulated data where the I-Channel and Q-Channel data are reduced to binary values, the first and second stages of the decoding are independent and can be performed in parallel.

Further, this invention discloses apparatus for multi-stage encoding and decoding a digital stream using an identical encoder and decoder at each level.

The apparatus for multi-stage encoding includes an identical p/q encoder 10 either with a multiplexer if only one encoder is used or j multiple copies of the same encoder. After encoding, there is a combiner for the coded outputs of each substream, which is coupled to the identical p/q encoder(s) 10. This combiner, combines the output into n symbols and sends it to a $2^j$ symbol generator 12. The $2^j$ symbol generator 12 provides an output including a plurality of modulator values, which are then transmitted over a channel. Subsequent to the p/q encoder 10 and prior to the $2^j$ symbol generator 12, an additional step of either puncturing or zero-tailing may be used to remove or add additional data bits.

The apparatus for decoding a digitally encoded signal of j substreams modulated by a $2^j$ symbol generator has a plurality, j, of stages. The apparatus has a receiver to receive the digitally encoded independent modulation components, $\bar{r}$. The vector, $\bar{r}$, is then sent to a pre-processor for level j=1, which mirrors any steps taken during the encoding stage. For example, if the data was punctured at the encoding stage, the pre-processor will be depuncture the data, or if the data was zero-tailed during the encoding stage, then the pre-processor will block decode the data in the decoding stage.

Next, the pre-processor sends the data to a p/q decoder 14 for level j=1. The decoder sends the output, $u_1$, to a buffer to store decoded information bits for level j=1. Then, a transmitter transmits the original modulation components, $\bar{r}$, as well as the previous stage decoded information bits to the transmitters, an identical p/q decoder 14, and a buffer to store decoded information bits for a total of j-levels.

A final apparatus for multi-stage encoding that maximizes the number of independent bits includes an p/q encoder 10, a combiner for the coded outputs of each substream, which combines the output into n symbols and sends it to a $2^j$ symbol generator 12. The $2^j$ symbol generator 12 provides an output including a plurality of modulator values, which are then transmitted over a channel. The $2^j$ symbol generator 12 utilizes nonstandard partitioning, which maps bits in disjoint regions of X-dimensional space. This allows particular bits to be eliminated from the subsequent decoding stages. Subsequent to the p/q encoder 10 and prior to the $2^j$ symbol generator 12, an additional step of either puncturing or zero-tailing may be used to remove or add additional data bits.

In accordance with a presently preferred embodiment of the present invention, the components, processes, and/or data structures are implemented using computer software. Different implementations may be used and may include other types of programming languages, computing platforms, computer programs, firmware, and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

While embodiments and applications of this invention have been shown and described, it would be apparent to those skilled in the art, after a review of this disclosure, that many more modifications than mentioned above are possible without departing from the inventive concepts herein. The invention, therefore, is not to be restricted except in the spirit of the appended claims.

What is claimed is:

1. A method for decoding an encoded signal, comprising the steps of:
    (A) pre-processing said encoded signal based on an encoding procedure for a first stage of a plurality of stages to generate a signal;
    (B) decoding said signal to generate a plurality of information bits;
    (C) storing said information bits;
    (D) delivering said encoded signal and said information bits to a next stage of said stages; and
    (E) repeating said steps of pre-processing, decoding, storing, and delivering for said stages to generate a plurality of substreams of decoded data.

2. The method according to claim 1 wherein step (D) comprises the sub-step of:
    multiplexing said encoded signal and said information bits to said first stage operating as said next stage.

3. The method according to claim 1, wherein each of said stages is an identical but separate stage to respectively decoded said substreams.

4. The method according to claim 1, further comprising the step of:
    adding or removing at least one bit from said encoded signal prior to decoding.

5. The method according to claim 4, wherein said adding comprises de-puncturing.

6. The method according to claim 4, where said removing comprises block decoding.

7. A method for encoding a digital stream, comprising the steps of:

(A) partitioning said digital stream into a plurality of substreams;

(B) selecting a component rate for each of said substreams, said component rates specifying an outlet length;

(C) encoding said substreams to generate a plurality of coded signals each having said output length;

(D) combining said coded signals into a symbol stream having said output length; and (E) generating a plurality of modulator values from said symbol stream utilizing a nonstandard partitioning that maps bits in disjoint regions of X-dimensional space, creating independent variables that can be identified and eliminated from decoding schemes.

8. The method according to claim 7, further comprising the step of:

applying said modulator values to a modulator, wherein each bit of said modulator values controls an independent modulation components.

9. The method according to claim 8, further comprising the step of:

modulating a transmitting signal with said independent modulator components.

10. The method according to clam 7, further comprising the step of:

removing or adding at least one bit from at least one of said coded signals.

11. The method according to claim 10, where said removing comprises puncturing.

12. The method according to claim 10, where said adding comprises zero-tailing.

13. The method according to claim 7, wherein step (c) comprises the sub-step of:

multiplexing said substreams through a single encoder.

14. The method according to claim 7, where said encoding is performed on said substreams in parallel.

15. The method according to claim 7, wherein step (E) comprises the sub-step of:

Phase Shift Keying (PSK) said symbol stream, wherein said nonstandard partitioning allows for a first data bit of said modulator values to be set to (i) zero for positive values of an I channel for said PSK and (ii) one for negative values of said I channel.

16. The method according to claim 15, wherein said nonstandard partitioning allows for a second data bit of said modulator values to be set to (i) zero for positive values of a Q channel for said PSK and (ii) one for negative values of said Q channel.

17. The Method according to claim 7, wherein step (E) comprises the sub-step of:

Quadrature Amplitude Modulating (QAM) said symbol stream, wherein said nonstandard partitioning allows for a first data bit of said modulator values to be set to (i) one for positive values of an I channel for said QAM and (ii) zero for negative values of said J channel.

18. The method according to claim 17, wherein said nonstandard partitioning allows for a second of said bite to be set to (i) zero for positive values of a Q channel for said QAM and (ii) one for negative values of said Q channel.

19. The method according to claim 18, wherein said nonstandard partitioning allows for a third data bit of said modulator values to be set to (i) zero for negative offset values of said I channel and (ii) one for positive offset values of said I channel.

20. The method according to claim 19, wherein said nonstandard partitioning allows for a fourth data bit of said modulator value to be set to (i) zero for negative offset values of said Q channel and (ii) one for positive offset values of said Q channel.

21. The method according to claim 7 wherein each of said component rates is expressed as $r_j = k_j / n_1$.

22. The method according to claim 21 wherein said output length is a least common multiple (LCM) of $n_1, \ldots n_3$.

23. A method of operating a digital communication system, comprising the steps of:

(A) splitting a digital stream into a plurality of substreams;

(B) selecting a component code rate for each of said substreams, said component rates specifying an output length;

(C) encoding said substreams to generate a plurality of coded signals each having said output length;

(D) combining said coded signals into a symbol stream having said output length;

(E) generating a plurality of modulator values from said symbol stream;

(F) transmitting an encoded signal modulated in response to said modulator values (G) pre-processing said encoded signal based on an encoding procedure for a first stage of a plurality of stages to generate a signal;

(H) decoding said signal to generate a plurality of information bits;

(I) storing said information bits;

(J) delivering said encoded signal and said information bits to a next stage of said stages; and (K) repeating said steps of pre-processing, decoding, storing, and delivering for said stages to generate said substreams of decoded data.

24. The method according to claim 23, further comprising the steps of:

removing or adding at least one bit from at least one of said coded signals; and removing or adding said at least one bit from said encoded signal prior to decoding.

25. The method according to claim 24, where (i) said removing comprises puncturing and (ii) said adding comprising de-puncturing.

26. The method according to claim 24, where (i) said adding comprises zero-tailing and (ii) said removing comprises block decoding.

27. A method of operating a digital communication system, comprising the steps of:

(A) splitting a digital stream into a plurality of substreams;

(B) selecting a component code rate for each of said substreams, said component rates specifying an output length;

(C) encoding said substreams to generate a plurality of coded signals each having said output length;

(D) combining said coded signals into a symbol stream having said output length;

(E) generating a plurality of modulator values from said symbol stream utilizing a nonstandard partitioning that maps bits in disjoint regions of X-dimensional space, creating independent variables that can be identified and eliminated from decoding schemes;

(F) transmitting an encoded signal modulated in response to said modulator values (G) pre-processing said encoded signal based on an encoding procedure for a first stage of a plurality of staged to generating a signal;

(H) decoding said signal to generate a plurality of information bits;

(I) storing said information bits;

(J) delivering said encoded signal and said information bits to a next stage of said stages; and (K) repeating said steps of pre-processing, decoding, storing, and delivering for said stages to generate said substreams of decoded data.

28. The method according to claim 27, further comprising the steps of:

removing or adding at least one bit from at least one of said coded signals; and removing or adding said at least one bit from said encoded signal prior to decoding.

29. The method according to claim 28, where (i) said removing comprises puncturing and (ii) said adding comprises de-puncturing.

30. The method according to claim 28, where (i) said adding comprises zero-tailing and (ii) said removing comprises block decoding.

31. An apparatus comprising:

a plurality of stages each comprising:

a pro-processor configured to generate a signal by process an encoded signal based on an encoding procedure;

a decoder configured to generate a plurality of information bits by decoding said signal; and a buffer configured to store said information bits; and a plurality of connections configured to deliver said encode signal and said information bits from a current stage of said stages to a next stage of said stages to generate a plurality of substreams of decoded data.

32. An apparatus comprising:

an encoder configured to encode a plurality of substreams to generate a plurality of coded signals each having an output length;

a combiner configured to combine said coded signals into a symbol stream having said output length; and a generator configured to generate a plurality of modulator values from said symbol stream utilizing a non-standard partitioning that maps bits in disjoint regions of X-dimensional space, creating independent variables that can be identified and eliminated from decoding schemes.

33. The apparatus of claim 32, further comprising:

a puncture configured to remove at least one bit from at least one of said coded signals.

34. The apparatus of claim 32, further comprising:

a zero-trailer configured to add at least one redundant bit to at least one of said coded signals.

35. A program storage device readable by a machine, tangibly embodying a program of instructions executable by the machine to perform a method for decoding an encoded signal, the method comprising the steps of:

(A) pre-processing said encoded signal based on an encoding procedure for a first stage of a plurality of stages to generate a signal;

(B) decoding said signal to generate a plurality of information bits;

(C) storing said information bit;

(D) delivering said encoded signal and said information bits to a next stage of said stages; and (E) repeating said steps of pre-processing, decoding, storing, and delivering for said stages to generate a plurality of substreams of decoded data.

* * * * *